United States Patent [19]

Back

[11] 4,006,807
[45] Feb. 8, 1977

[54] POWER TRANSFER MECHANISM

[75] Inventor: Carl Franklin Back, Orrville, Ohio

[73] Assignee: Ingersoll-Rand Company, Woodcliff Lake, N.J.

[22] Filed: Feb. 18, 1976

[21] Appl. No.: 659,134

[52] U.S. Cl. .................... 192/48.9; 192/87.1
[51] Int. Cl.² ............... F16D 21/02; F16D 25/10
[58] Field of Search .......... 74/665 P, 665 F, 665 G; 192/87.1, 87.14, 87.15, 48.1, 48.8, 48.9

[56] References Cited
UNITED STATES PATENTS

| | | | |
|---|---|---|---|
| 3,338,114 | 8/1967 | Jacobson | 192/48.9 X |
| 3,349,877 | 10/1967 | Downs | 192/48.9 X |
| 3,844,184 | 10/1974 | Nelson et al. | 74/665 P X |

*Primary Examiner*—Samuel Scott
*Assistant Examiner*—Lance W. Chandler
*Attorney, Agent, or Firm*—Frank S. Troidl

[57] ABSTRACT

The power transfer mechanism includes an input shaft which may be selectively connected to one of two or more output shafts. The input shaft leads to a housing which has an output shaft support plate slidably mounted in the housing. The housing also has mounted therein a rotatable clutch member connected to the input shaft, a rotatable clutch member connected to each output shaft and means for selectively coupling the clutch member of the input shaft with one of the output shaft clutch members.

4 Claims, 4 Drawing Figures

4,006,807

POWER TRANSFER MECHANISM

This invention relates to power transfer mechanisms. More particularly, this invention is a new power transfer mechanism system for selectively coupling an input shaft to one of two or more output shafts.

There are, of course, currently used power transfer mechanisms, particularly adapted to transfer driving element power from one to another of driven elements. However, all the currently used power transfer mechanisms on the market today transfer the power from the input shaft to a selectively picked output shaft through a set of gears and/or chains. One such transfer mechanism is shown in U.S. Pat. No. 3,338,114 granted Aug. 29, 1967 to H. C. Jacobson, and entitled "Gear Transfer Mechanism."

Such currently utilized power transfer mechanisms have been fairly satisfactory over the years, but now with the greater horsepower requirements they have become very limited in their use.

My new power transfer mechanism does not use either chains or gears. Briefly described, the transfer mechanism comprises a housing with one input shaft and two output shafts. These two output shafts are shifted into the correct operating position and engaged with the input shaft by means of a heavy duty jaw clutch. The shifting is controlled by the air from the truck air-break system.

It is important in any jaw clutch operation to insure true alignment and prevent the tendency of the clutches to become partially disengaged. This new power transfer mechanism includes a tapering arrangement to insure accuracy of alignment and prevent the clutches from becoming partially engaged. The clutches may be connected by an air pressure which is constantly applied while the clutches are engaged to insure positive engagement.

The invention as well as its many advantages may be further understood by reference to the following detailed description and drawings in which.

Like parts in the various figures are referred to by like numbers.

Figure 1:
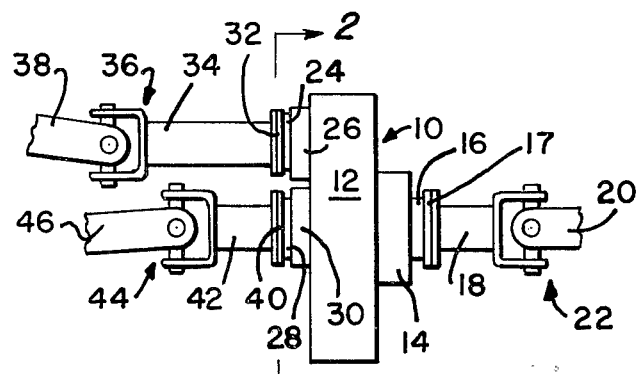
FIG. 1 is a side elevational view showing the general arrangement of the power transfer mechanism.

Referring to the figures, and more particularly to FIG. 1, the new power transfer mechanism includes a housing 10 consisting of a generally rectangular portion 12, and a smaller rectangular portion 14. Of course, the housing could be shaped other than rectangular such as cylindrical or any other desired shape.

An input shaft 16 extends into the housing 10 through the smaller rectangular portion 14. The input shaft 16 is connected to a shaft 18 which is driven by any desirable source of power such as a truck engine (not shown). The truck engine power is transmitted to the input shaft 16 through yoke 20, universal joint 22, and shaft 18.

The first output shaft 24 is mounted for rotation within the output shaft support 26 extending from housing 10. A second output shaft 28 is mounted for rotational movement within output shaft support 30 extending from housing 10. Output shaft 24 is connected by coupling 32 to a shaft 34, which in turn is connected through the univeral joint 36, to a yoke 38. Yoke 38 may be connected to a shaft (not shown) which is used to drive for example a drill machine connected to the truck and used for drilling operations.

Output shaft 28 is connected through coupling 40 to a shaft 42 which in turn is connected through univeral joint 44 to a yoke 46. The yoke 46 is connected to a shaft (not shown) which may be used for example to power the rear wheels of the truck.

Figure 2:
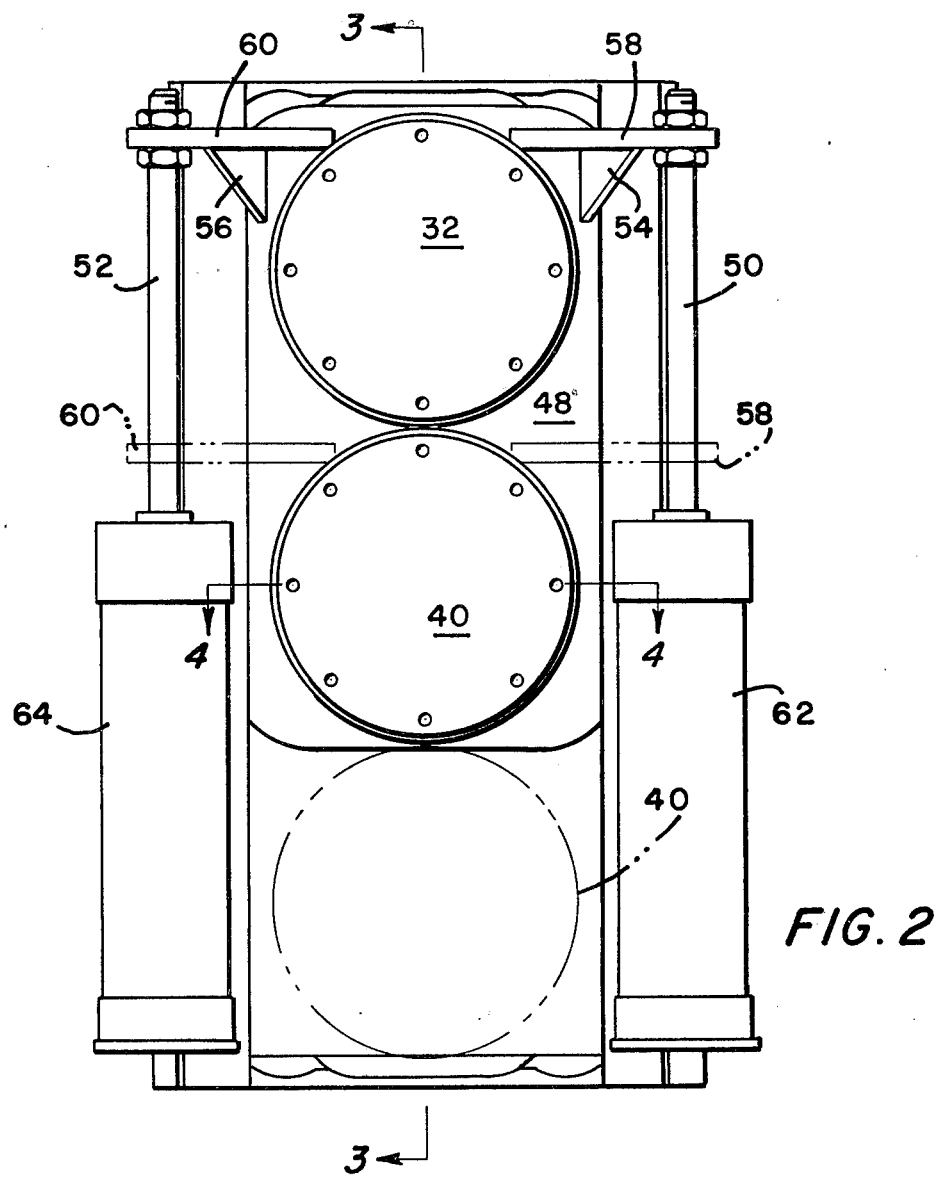
FIG. 2 is a front elevational view, on an enlarged scale, taken generally along lines 2—2 of FIG. 1 and in the direction of the arrows.

Referring more specifically to FIG. 2, the output shafts are mounted within an output shaft support plate 48. The support plate 48 is slidably mounted within the portion 12 of housing 10. The support plate 48 is connected to pneumatically operated rods 50 and 52 through gussets 54 and 56, respectively and brackets 58 and 60, respectively. Rods 50 and 52 are operated by air cylinders 62 and 64, respectively. When the air cylinders 62 and 64 are operated, the support plate 48 is slidably moved up and down. The movement of support plate 48 is translational, not rotary.

Figure 3:
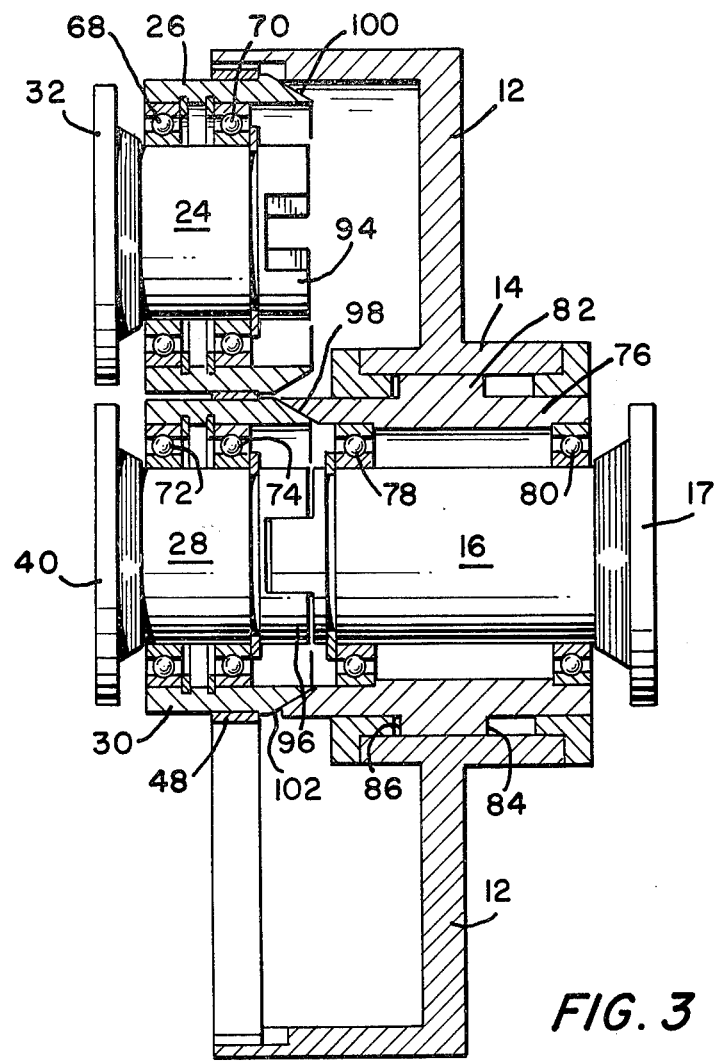
FIG. 3 is a sectional view taken along lines 3—3 of FIG. 2 and in the direction of the arrows.
Figure 4:
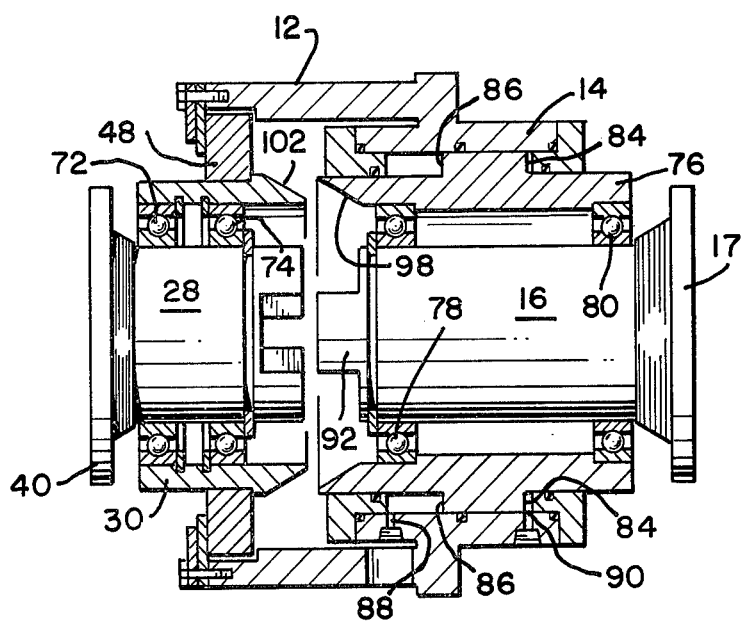
FIG. 4 is a sectional view on a slightly enlarged scale taken generally along lines 4—4 of FIG. 2 and in the direction of the arrows.

Referring more specifically to FIG. 3 and FIG. 4, it can be seen that the output shaft 24 is rotatably mounted within output shaft support 26 through bearings 68 and 70. Also, output shaft 28 is rotatably mounted within output shaft support 30 through bearings 72 and 74.

The input shaft 16 is rotatably mounted within the input shaft support 76 through bearings 78 and 80. The input shaft support 76 is provided with an area 82 of larger diameter thus providing shoulders 84 and 86. Referring specifically to FIG. 4, air ports 88 and 90 lead into a space adjacent shoulder 86 and a space adjacent shoulder 84, respectively.

Input shaft 16 is provided with an integral jaw clutch member 92. Similarly, output shafts 24 and 28 are provided with jaw clutch members 94 and 96, respectively. The inside diameter of the inner end of the input shaft support 76 is tapered radially outwardly at 98. The outer diameters of the inner ends of output shaft supports 26 and 30 are tapered radially inwardly at 100 and 102, respectively.

In operation, assume the input shaft 16 is coupled to the output shaft 28 as shown in FIGS. 1 and 3. Thus operation of the truck power will cause operation through output shafts 28, 42, and 46 of for example the truck wheels. The input shaft 16 is selectively coupled to the output shaft 28 through jaw clutch member 96. Note also that the tapered portions 98 and 102 of the input shaft support 76 and output shaft support 30, respectively, are firmly connected together. The cooperative action of the jaw clutches and the tapered portions of the support members insure that the jaw clutches are firmly connected together and aligned. The clutches are kept firmly connected also because air is continuously applied through port 90 (see FIG. 4) against the shoulder 84 of the larger diameter portion 84 of input shaft support 76.

In order to switch the truck power from the truck wheels to say a drill machine, the air pressure is discontinued through port 90 and added through port 88 against shoulder 86 of the larger diameter portion 84 of input shaft support 76. The input shaft support and jaw clutch 92 on input shaft 16 is thereby moved out of connection (see FIG. 4) with the tapered portion 102 of output shaft support 30 and jaw clutch 96 of output shaft 28. Referring to FIG. 2, the pneumatic cylinders 62 and 64 are then operated to move rods 50 and 52, respectively downwardly, thereby moving the plate 48 along with the output shafts 24 and 28 downwardly to align the output shaft 24 with the input shaft 16. The air is then again fed through port 90 (see FIG. 4) against the shoulder 84 to move the input shaft support 76 into engagement with the output shaft support 26. The jaw clutch 92 of input shaft 16 also comes into tight coupling engagement with the jaw clutch 94 of output shaft 24. Thereafter, the truck engine power is used to operate the drilling machine.

I claim:

1. In a power transfer mechanism: a housing; an output shaft support plate mounted to move translationally within the housing; a pair of output shafts mounted in said translationally movable plate for movement therewith; an input shaft mounted in said housing; a rotatable clutch member connected to each output shaft and a rotatable clutch member connected to the input shaft; and means for selectively coupling the clutch member of the input shaft with either of the output shaft clutch members.

2. A power transfer mechanism in accordance with claim 1 wherein: the means for selectively coupling the input shaft clutch member with either of the output shaft clutch members comprises: means for moving the output shaft support plate from a position in the housing where the first output shaft is in line with the input shaft and to a second position where the second output shaft is in line with the input shaft; and the input shaft rotatable clutch member is adapted to be moved into and out of engagement with the selected output shaft rotatable clutch member.

3. A power transfer mechanism in accordance with claim 2 wherein: each output shaft is mounted in a generally cylindrical output shaft support which in turn is mounted in the translationally movable support plate, each output shaft support having at least a portion of its outer periphery tapering radially inwardly toward the axis of said output shaft; and the input shaft is mounted in a generally cylindrical input shaft support, said input shaft support having at least a portion of its inner periphery having a surface which tapers radially outwardly away from the axis of said input shaft, with the tapered surface of the output shaft support adapted to mate with the tapered surface of the input shaft support, whereby upon engagement of the mating tapering portions, the selectively coupled output shaft is in exact alignment with the input shaft.

4. A power transfer mechanism comprising: a housing; an output shaft support plate translationally movable within said housing, pneumatic means for moving said output shaft support plate; a pair of output shaft clutch member supports mounted in the support plate, each output shaft member clutch support having a tapering portion; a rotatable output shaft with a jaw-clutch member mounted within each of the clutch member supports; an input shaft support also mounted in said housing; said input shaft clutch member support having a tapering portion adapted to mate with the tapering portion of the output shaft clutch member supports; a rotatable input shaft with a jaw-clutch member mounted within the input shaft clutch member support; and pneumatic means for moving the input shaft clutch member support into engagement with a selected output shaft clutch member support to lockingly engage the input shaft jaw-clutch member with the selected output shaft jaw-clutch member.

* * * * *